(12) United States Patent
Kohli (10) Patent No.: US 11,935,058 B2
(45) Date of Patent: *Mar. 19, 2024

(54) SYSTEMS AND METHODS FOR AUTHENTICATING A USER USING PRIVATE NETWORK CREDENTIALS

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/403,655

(22) Filed: Aug. 16, 2021

(65) Prior Publication Data

US 2021/0374743 A1 Dec. 2, 2021

Related U.S. Application Data

(63) Continuation of application No. 15/292,999, filed on Oct. 13, 2016, now Pat. No. 11,093,940.

(51) Int. Cl.
*G06Q 20/40* (2012.01)
*G06Q 20/34* (2012.01)
*G06Q 30/02* (2023.01)

(52) U.S. Cl.
CPC ......... *G06Q 20/4015* (2020.05); *G06Q 20/34* (2013.01); *G06Q 20/4014* (2013.01); *G06Q 20/405* (2013.01); *G06Q 30/02* (2013.01)

(58) Field of Classification Search
CPC ............................ G06Q 20/40; G06F 21/6245
See application file for complete search history.

(56) References Cited

U.S. PATENT DOCUMENTS

| 6,711,551 B1 | 3/2004 | Itakura et al. |
| 2005/0010488 A1 | 1/2005 | Itakura et al. |
| 2006/0020542 A1 | 1/2006 | Litle et al. |

(Continued)

OTHER PUBLICATIONS

PCT International Search Report and Written Opinion, Application No. PCT/US2017/049044, dated Dec. 15, 2017, 12 pps.

*Primary Examiner* — Neha Patel
(74) *Attorney, Agent, or Firm* — Armstrong Teasdale LLP (57) ABSTRACT

A cardholder authentication computing device for authenticating user computing devices during online payment transactions are provided. The cardholder authentication computing device leverages pre-authentication of a user by a private network to facilitate authentication of a user in the context of an online payment transaction between the user and a merchant. During the course of an online payment transaction, the cardholder authentication computing device may receive an authentication request messages containing pre-authentication data from a merchant computing device. The cardholder authentication computing device then authenticates the user based, in part, on the pre-authentication data. In certain embodiments, the cardholder authentication computing device may also determine whether one or more partner services apply to transactions between the user and the merchant based on the user's affiliation with the organization.

20 Claims, 4 Drawing Sheets

(56) References Cited

U.S. PATENT DOCUMENTS

| | | | |
|---|---|---|---|
| 2006/0224752 A1* | 10/2006 | Parekh | |
| 2007/0078761 A1 | 4/2007 | Kagan et al. | |
| 2009/0018908 A1* | 1/2009 | Dersovitz | |
| 2009/0198996 A1 | 8/2009 | Lie et al. | |
| 2010/0211491 A1 | 8/2010 | Kagan et al. | |
| 2011/0238581 A1* | 9/2011 | Severson et al. | |
| 2013/0133086 A1 | 5/2013 | Liberman et al. | |
| 2013/0219164 A1* | 8/2013 | Hamid | |
| 2016/0078436 A1* | 3/2016 | Tomasofsky et al. | |
| 2016/0125376 A1 | 5/2016 | Beatty et al. | |
| 2016/0180333 A1* | 6/2016 | Leyva | |
| 2016/0260100 A1 | 9/2016 | Wiesman | |
| 2016/0283740 A1* | 9/2016 | Roundtree | |
| 2016/0294810 A1* | 10/2016 | Wang et al. | |
| 2017/0109752 A1* | 4/2017 | Hubbard et al. | |

\* cited by examiner

SYSTEMS AND METHODS FOR AUTHENTICATING A USER USING PRIVATE NETWORK CREDENTIALS

CROSS-REFERENCE TO RELATED APPLICATIONS

This application is a continuation of and claims the benefit of priority to U.S. patent application Ser. No. 15/292,999, filed Oct. 13, 2016, which is hereby incorporated by reference herein in its entirety.

BACKGROUND

The field of the disclosure relates generally to online fraud detection and, more particularly, to network-based systems and methods for authenticating users that have previously been authenticated through a private network.

Organizations generally operate private networks accessible only to members of a given organization. For example, many companies operate networks accessible only to employees. To access a private network, a user must generally provide credentials in the form of one or more of a login, a password, a randomly generated security code, a cookie or similar token installed on the user's computing device, and the like.

Online payment transactions may also include authentication of a purported cardholder who has entered into a transaction with an online merchant. Authentication generally involves determining whether the purported cardholder is the actual cardholder whose account the purported cardholder provided during the online transaction. Such authentication may generally involve the purported cardholder providing a user name, a password, one or more answers to security questions, a personal identification number, personal information, and the like. After the purported cardholder has been authenticated, the online transaction is generally permitted to proceed.

For a user who accesses merchant websites and makes online transactions via a private network, requiring the user to provide authentication credentials both to access the private network and to perform the transactions is often unnecessary. For example, the credentials required to log into a private network are often more stringent than those required to perform an online payment transaction. Accordingly, requiring the user to provide additional credentials for the online payment transaction hampers the purchasing experience without providing any additional benefits for fraud detection.

In light of the foregoing, a system and method that leverages private network credentials for seamless authentication of online payment transactions is desirable.

BRIEF DESCRIPTION OF THE DISCLOSURE

In one aspect, a cardholder authentication computing device is disclosed. The cardholder authentication computing device includes one or more processors in communication with one or more memory devices and is configured to: receive, from a merchant computing device, an authentication request message corresponding to an online payment transaction between a merchant and a purported cardholder purporting to be an actual cardholder, wherein the authentication request message includes pre-authentication data that indicates that the purported cardholder accessed the merchant computing device through a private network and that the purported cardholder was authenticated by the private network; authenticate the purported cardholder for completing the online payment transaction based, at least in part, on the pre-authentication data; generate an authentication response message indicating that the purported cardholder is the actual cardholder; and transmit the authentication response message to the merchant computing device.

In a second aspect, a computer-implemented method for authenticating user computing devices during online payment transactions is provided. The method is implemented using a cardholder authentication computing device in communication with one or more memory devices. The method includes: receiving, from a merchant computing device, an authentication request message corresponding to an online payment transaction between a merchant and a purported cardholder purporting to be an actual cardholder, wherein the authentication request message includes pre-authentication data that indicates that the purported cardholder accessed the merchant computing device through a private network and that the purported cardholder was authenticated by the private network; authenticating the purported cardholder for completing the online payment transaction based, at least in part, on the pre-authentication data; generating an authentication response message indicating that the purported cardholder is the actual cardholder; and transmitting the authentication response message to the merchant computing device.

In yet another aspect, a computer-readable storage medium having computer-executable instructions embodied thereon is provided. When executed by a device authentication computing device having one or more processors in communication with one or more memory devices, the computer-executable instructions cause the fraud detection computing device to: receive, from a merchant computing device, an authentication request message corresponding to an online payment transaction between a merchant and a purported cardholder purporting to be an actual cardholder, wherein the authentication request message includes pre-authentication data that indicates that the purported cardholder accessed the merchant computing device through a private network and that the purported cardholder was authenticated by the private network; authenticate the purported cardholder for completing the online payment transaction based, at least in part, on the pre-authentication data; generate an authentication response message indicating that the purported cardholder is the actual cardholder; and transmit the authentication response message to the merchant computing device.

BRIEF DESCRIPTION OF THE DRAWINGS

FIGS. 1-4 show example embodiments of the methods and systems described herein.

DETAILED DESCRIPTION OF THE DISCLOSURE

Systems and method described herein leverage pre-authentication of a user of a private network to facilitate authentication of online payment transactions by the user. For example, systems and methods described herein may be used to enable seamless authentication of a cardholder, i.e., authentication of a cardholder without requiring the cardholder to provide additional credentials beyond those required to access a private network, and to identify subsequent online payment transactions by the cardholder as having a low risk of fraud.

For purposes of this disclosure, the term "private network" is used to generally describe a limited-access network for which a user is required to provide some form of credentials to access. For example, a private network may be operated by an organization and may be accessible to users who are members, employees, or otherwise affiliated with the organization and who have been provided credentials by the organization. An organization may be, but is not limited to, an individual, a group of individuals, a business entity, a governmental entity, a non-profit entity, an academic entity, and the like. A private network generally includes an authentication server, referred to herein as a private network authentication server, which authenticates a user before granting the user access to the private network. For example, the private network authentication server may require a user to provide a user name and password and/or a security key (such as a randomly generated authentication code). The private network authentication server may also grant access to the private network based on a cookie, software token, or other security-related data stored in a computing device used by the cardholder to access the organization network.

In systems and methods described herein, a user is pre-authenticated by successfully initiating a session on a private network. For example, the session may be initiated when the user successfully logs into the private network. A user may connect to a private network in various ways including, but not limited to, a direct physical connection (e.g., an Ethernet connection) to the private network or a wireless connection to the private network. A user may also connect to the private network using a remote connection, such as a virtual private network (VPN) connection.

To access the private network, the user is generally required to perform an authentication or login process in which the user provides credentials and the private network authentication server validates the credentials. In certain private networks, a user who has successfully logged onto the private network may be permitted to access the Internet or other external networks through the private network. A user with access to the Internet may further access merchant websites and perform online payment transactions on such merchant websites. In certain embodiments, an organization or other host of a private network may operate an enterprise or intranet portal accessible by the user that includes links or other ways for directing the user to one or more merchant websites.

When the user accesses a merchant website via a private network, the private network authentication server may transmit authentication data to one or more computing devices associated with the merchant website. For example, the merchant website may be communicatively coupled to a merchant authentication server for authenticating users who access the merchant website. Based on the authentication data received from the private network authentication server, the merchant authentication server may seamlessly authenticate the user and permit the user to navigate the merchant website, to select items for purchase, to initiate online payment transactions to purchase items, and to perform other actions generally requiring authentication by the merchant authentication server.

In certain embodiments, automatic authentication of a user when accessing a merchant website through a private network requires the user to first register with the merchant website. Registering with the merchant website generally includes creating an account with the merchant website and providing a username or other user identifier (such as an email address) to identify the user. In certain embodiments, registering includes the merchant website creating a profile or account for the user including, without limitation, additional user information, user payment information, user preferences, a browsing history, and a purchase history. If a user registers with the merchant website through a private network, registration may further include associating the user with the organization corresponding to the private network and/or a program, such as a discount or rewards program, in which the organization is enrolled.

Authentication data exchanged between the private network authentication server and the merchant authentication server includes, without limitation, one or more of identification information corresponding to the user being authenticated, identification information corresponding to the private network authentication server or corresponding organization, an indicator identifying that the user was authenticated by the private network authentication server, an indicator indicating the type of authentication performed by the private network authentication server, a time of authentication by the private network authentication server, and the scope of the authentication by the private network authentication server. For example, in one embodiment, the authentication data transmitted from the private network authentication server to the merchant authentication server includes a user identifier, such as a username or email, along with authentication information indicating that the user was properly authenticated by the private network authentication server using a suitable authentication method.

Authentication data may be exchanged between the private network and the merchant using various techniques. For example, in certain embodiments, the private network authentication server may generate a ticket or token including the authentication data. In certain embodiments, for example, the authentication data is exchanged in a format that conforms to one or more standards, such as the Security Assertion Markup Language (SAML) specification. In other embodiments, the private network authentication server may forward or otherwise distribute at least some of the credentials provided by the user during login/authentication for the private network to the merchant authentication server. In certain embodiments, the private network authentication server submits the authentication data as part of a hypertext transfer protocol (http) request to the merchant website.

When the merchant authentication server receives authentication data from the private network authentication server, subsequent authentication corresponding to the merchant website is generally achieved, in part, by referencing the authentication data. For example, the merchant authentication server receives a token including a user identifier and an indication that the user was authenticated by the private network authentication server using a particular authentication method. In response, the merchant authentication server performs a lookup of the user identifier to determine whether the user previously registered with the merchant website. The merchant authentication server then determines if the authentication method applied by the private network meets the requirements of the merchant website. If so, the user is authenticated and is permitted to access the website without providing any additional credentials.

As a user navigates a merchant website via a private network, the user may attempt to perform an online payment transaction for products or services offered by the merchant. To complete a purchase, the user is generally required to provide payment account information to the merchant website. Prior to processing the online payment transaction, a cardholder authentication computing device in accordance with this disclosure may authenticate the user by determining whether the purported cardholder, i.e., the user, is the actual cardholder corresponding to the provided payment account information. To do so, the merchant authentication server (or other merchant computing device) may send an authentication request message to the cardholder authentication computing device. The authentication request message may include pre-authentication data indicating that the purported cardholder/user was authenticated by a private network. For example, the pre-authentication data may be, but is not limited to, a flag or data field of the authorization request message, an authentication token received by the merchant from the private network authentication server, or at least a portion of the credentials provided by the user when accessing the private network. In other embodiments, the pre-authentication data may be data indicating the identity of one or both of the merchant and an entity, such as a business, associated with the private network. The cardholder authentication computing device may then compare the merchant, the entity, and/or the combination of the merchant and the entity to a repository containing a list of known merchants and entities having trusted relationships. The authentication request message may also include transaction data corresponding to the online payment transaction including, but not limited to, the type and price of the goods or services being purchased by the cardholder.

Based, at least in part, on the pre-authentication data contained in the authentication request message, the cardholder authentication computing device may authenticate the cardholder. To authenticate the cardholder, the cardholder authentication computing device may refer to one or more of historical transaction data, verified payment account information, and the like to determine whether the purported cardholder/user is the actual cardholder associated with the submitted payment account information. In certain embodiments, the cardholder authentication computing device may authenticate a cardholder by calculating a fraud risk score and determining whether the fraud risk score exceeds a predetermined threshold. If a sufficient risk of fraud exists, the cardholder authentication computing device may take remedial measures including, but not limited to, rejecting the authentication request, issuing an alert to one of the actual cardholder and the issuing bank associated with the actual cardholder, and temporarily suspending account activity.

When the cardholder authentication computing device receives an authentication request message include pre-authentication data, the cardholder authentication computing device may perform a modified authentication process as compared to an authentication process applied to non-pre-authenticated transactions. In certain embodiments, the cardholder authentication computing device may perform a limited authentication process because the pre-authentication data serves as a general indicator that the purported cardholder represents a low fraud risk. For example, the cardholder authentication computing device may modify the authentication process for pre-authenticated payment transactions by raising thresholds for determining that a transaction represents a fraud risk, disregarding certain portions of a regular (i.e., non-pre-authenticated) authentication analysis, modifying weights assigned to certain data elements in the authentication analysis, and the like.

In certain embodiments, when the cardholder authentication computing device receives an authentication request message containing pre-authentication data, the cardholder authentication computing device may authenticate the cardholder using data based on the private network. For example, the authentication request message may include pre-authentication data from which the cardholder authentication computing device may identify the private network that performed the pre-authentication and may consider characteristics of the private network or an organization associated with the private network when authenticating the purported cardholder. For example, the cardholder authentication computing device may compare the host internet protocol (IP) address or corresponding geographic location of the purported cardholder to a public IP address of the private network or corresponding geographic location of the organization associated with the private network. To the extent the host IP or location of the cardholder is inconsistent with that of the private network or the associated organization, the authentication request may be rejected.

Following the authentication process, the cardholder authentication computing device generates an authentication response message indicating that the purported cardholder is the actual cardholder associated with the payment account information and transmits the authentication response message to the merchant computing device. In certain embodiments, the authentication response message may include an accountholder authentication value (AAV) or similar authentication token indicating that the purported cardholder was authenticated. The authentication token may then be used by the merchant, for example, during a payment authorization process to indicate to an issuing bank that the cardholder was authenticated.

As part of the authentication process, the cardholder authentication computing device may also determine whether the payment card (or corresponding virtual payment card) used for the transaction is associated with an organization (e.g., a corporate card) and may determine whether any particular payment account use parameters apply. For example, use of a corporate card may be subject to certain spending limits or limited to certain purchase categories. Accordingly, in certain embodiments, the cardholder authentication computing device may determine such use parameters and include indicators corresponding to any applicable payment account use parameters in the authentication response message. In cases where transaction data is included in the authentication request message, the cardholder authentication computing device may determine whether the transaction data complies with the payment card use parameters and may accept or reject authentication based on such a determination. To the extent the attempted purchase falls outside such parameters, the authentication computing device may decline authentication of the transaction and/or include a corresponding indication in the authentication response message.

In certain embodiments, an authentication request message including pre-authentication data may cause the cardholder authentication computing device to determine whether one or more partner services apply to online payment transactions between the merchant and the purported cardholder/user. For example, the cardholder authentication computing device may first determine, based on the pre-authentication data, the identity of an organization associated with the private network. The cardholder authentication computing device may then determine whether any partner services are offered between the merchant and the organization. Such partner services may include, but are not limited to, discounts, rebates, free shipping, and the like. Accordingly, in response to receiving an authentication request message from a merchant computing device, the cardholder authentication computing device may additionally determine whether one or more partner services apply to the online payment transaction. The cardholder authentication computing device may then include partner service data, such as an identifier corresponding to applicable partner services and/or the parameters of such services (e.g., discount amounts), in the authentication response message prior to sending the authentication response message to the merchant computing device.

In certain embodiments, access to partner services require the cardholder to enroll with one or more of the organization of which the cardholder is a member, the merchant providing the partner services, and the cardholder authentication computing device. Enrollment may also include an additional verification step in which the merchant, organization, or cardholder authentication computing device sends an email or other message to the cardholder confirming enrollment.

When the merchant computing device receives the authentication response message, the merchant computing device may process the transaction accordingly. For example, if the authentication response message indicates that the cardholder is authenticated, the merchant may submit the online payment transaction to an issuing bank for authorization. If, on the other hand, the authentication response message is negative, the merchant may decline the transaction and may communicate the decline of the transaction to the cardholder.

The methods and systems described herein may be implemented using computer programming or engineering techniques including computer software, firmware, hardware or any combination or subset thereof, wherein the technical effect is achieved by performing at least one of: (a) receiving, from a merchant computing device, an authentication request message corresponding to an online payment transaction between a merchant and a purported cardholder purporting to be an actual cardholder, wherein the authentication request message includes pre-authentication data that indicates that the purported cardholder accessed the merchant computing device through a private network and that the purported cardholder was authenticated by the private network; (b) authenticating the purported cardholder for completing the online payment transaction based, at least in part, on the pre-authentication data; (c) generating an authentication response message indicating that the purported cardholder is the actual cardholder; and (d) transmitting the authentication response message to the merchant computing device.

The systems and methods described herein provide at least the technical advantages of (a) improving overall efficiency of cardholder authentication by reducing unnecessary and redundant authentication processes; (b) reducing bandwidth required for authentication by reducing unnecessary and redundant authentication processes; and (c) reducing transaction friction (i.e., the difficulty and complexity faced by a cardholder attempting to complete a transaction) without compromising security.

Example of Payment Card Transaction Network

Figure 1:
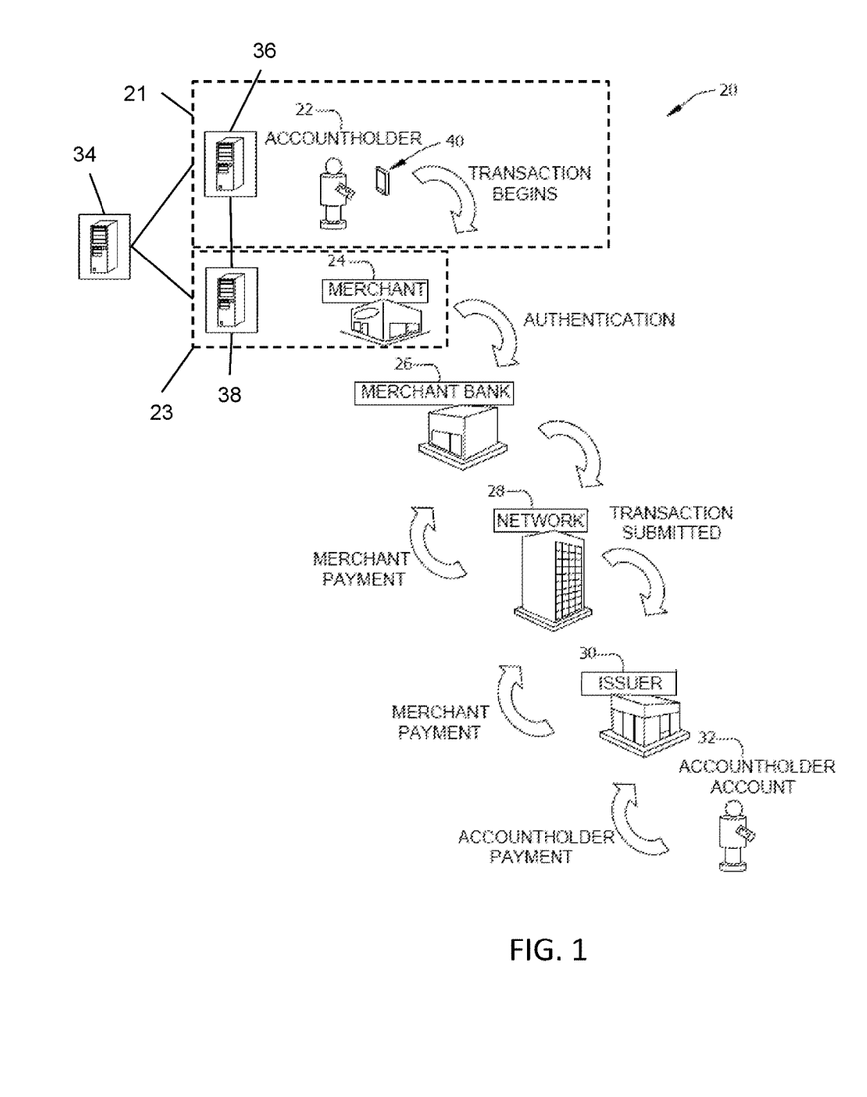
FIG. 1 is a schematic diagram illustrating a payment platform having a cardholder authentication computing device.

FIG. 1 is a schematic diagram illustrating a payment platform 20 that includes a cardholder authentication computing device 34 and which provides processing services to various financial entities. Embodiments described herein may relate to a transaction card system, such as a payment card payment system using the MasterCard® interchange network. The MasterCard® interchange network is a set of proprietary communications standards promulgated by MasterCard International Incorporated for the exchange of financial transaction data and the settlement of funds between financial institutions that are associated with MasterCard International Incorporated. (MasterCard is a registered trademark of MasterCard International Incorporated located in Purchase, New York).

In a typical transaction card system, a financial institution referred to as the "issuer" issues a transaction card, such as a credit card, debit card, and the like, to the consumer or accountholder 22 (also referred to herein as a cardholder), who uses the transaction card to tender payment for a purchase from merchant 24. To accept payment with the transaction card, merchant 24 normally establishes an account with a financial institution that is part of the financial payment system. This financial institution is referred to as the "merchant bank," the "acquiring bank," or the "acquirer." In one embodiment, accountholder 22, also referred to as cardholder, tenders payment for a purchase using a transaction card at a transaction processing device 40 (e.g., a point of sale device or a user computing device such as a laptop computer, a desktop computer, a smartphone, and the like), and merchant 24 then requests authorization from a merchant bank 26 for the amount of the purchase. The request is usually performed through the use of a point-of-sale terminal, which reads account information from a magnetic stripe, a chip, embossed characters, and the like, included on the transaction card of the accountholder 22 and communicates electronically with the transaction processing computers of merchant bank 26. In the context of transactions with online merchants, an accountholder 22 may provide their account information, such as their account number, a card verification number, an expiration date, and the like through a website. Alternatively, merchant bank 26 may authorize a third party to perform transaction processing on its behalf. In this case, the point-of-sale terminal may be configured to communicate with the third party. Such a third party may be referred to as a "merchant processor," an "acquiring processor," or a "third party processor."

Using an interchange network 28, computers of merchant bank 26 or merchant processor may communicate with computers of an issuer bank 30 to determine whether account 32 of accountholder 22 is in good standing and whether the purchase is covered by an available credit line of the account 32 corresponding to accountholder 22. Based on these determinations, the request for authorization may be declined or accepted. If the request is accepted, an authorization code may be issued to merchant 24.

During a payment card transaction, and particularly an online payment transaction, authentication may be used to reduce fraudulent transactions and to improve the overall security of transactions conducted over payment platform 20. Authentication generally refers to the process of verifying that the entity providing payment information during the payment transaction, i.e., a purported accountholder or cardholder, is in fact accountholder 22, i.e., the party to whom the issuer bank 30 issued the payment card (or an entity with the party's permission).

Authentication may be accomplished in various ways. For example, in in-person transactions, merchant 24 may authenticate a transaction by examining a presented payment card and comparing a name and signature on the payment card to those on a piece of identification, such as a driver's license. In online purchase transactions, authentication may be performed by requesting one or more of a password, an answer to a security question, confirmation of past purchases, and other identifying information. Online purchase transactions may also be authenticated by verifying that the device on which the transaction is being performed corresponds to a known device of the accountholder. For example, a user computing device used in an online purchase transaction may be authenticated by determining the presence and/or contents of a "cookie" or similar token on the user computing device.

In payment platform 20, authentication is performed by a cardholder authentication computing device 34. In embodiments of systems and methods according to the present disclosure, authentication by cardholder authentication computing device 34 is performed, at least in part, based on pre-authentication of accountholder 22. Pre-authentication generally refers to the process of authenticating accountholder 22 through one or more information systems prior to accountholder 22 being authenticated by cardholder authentication computing device 34.

Accountholder 22 is first authenticated by private network authentication server 36, which performs authentication for private network 21. Specifically, private network authentication server 36 authenticates accountholder 22 when accountholder 22 logs onto private network 21 using transaction processing device 40, which may be a computing device such as a laptop computer, a desktop computer, a tablet, a smartphone, and the like. To log onto private network 21, accountholder 22 may be required to provide credentials such as a username and password to private network authentication server 36. Transaction processing device 40 may also store a token or other data corresponding to accountholder 22's credentials. The token or data may then be provided to or accessed by private network authentication server 36 when accountholder 22 attempts to log onto private network 21 using transaction processing device 40. Transaction processing device 40 may connect to private network 21 in various ways. For example, transaction processing device 40 may be directly connected to private network 21 or may access private network 21 through a wireless connection or virtual private network (VPN) connection.

After accountholder 22 is authenticated by private network authentication server 36, accountholder 22 may use transaction processing device 40 to access a merchant website associated with merchant 24 through private network 21. Merchant 24 may be part of a second information system generally indicated as merchant network 23. Accessing certain features of the merchant website may require accountholder 22 to log into or otherwise be further authenticated by merchant authentication server 38.

In systems and methods according to this disclosure, authentication by merchant authentication server 38 is achieved by leveraging the prior authentication performed by private network authentication server 36. Private network authentication server 36 generally provides authentication data to merchant authentication server 38, the authentication data indicating that accountholder 22 was previously authenticated for purposes of using private network 21. The authentication data may further include, without limitation, one or more of identification information corresponding to accountholder 22, identification information corresponding to the private network authentication server 36, an indicator identifying that accountholder 22 was authenticated by private network authentication server 36, an indicator indicating the type of authentication performed by private network authentication server 36, a time of authentication by private network authentication server 36, and the scope of the authentication by private network authentication server 36. The authentication data may be transmitted by private network authentication server 36 to merchant authentication server 38 in the form of a ticket or token and may be exchanged between private network authentication server 36 and merchant authentication server 38 using one or more standards, such as the Security Assertion Markup Language (SAML) specification.

In certain embodiments, private network authentication server 36 implements various security mechanisms to ensure that authentication data exchanged between private network authentication server 36 and merchant network authentication server 38 is secure. For example, in one embodiment, private network authentication server 36 implements at least one of a transport-level security mechanism and a message-level security mechanism to ensure the integrity and confidentiality of authentication data sent between private network authentication server 36 and merchant network authentication server 38. Transport-level security mechanisms generally provide privacy and data integrity between two communicating computer applications and are characterized by at least one of a private connection between the computer applications, identity authentication of the communicating parties using public-key cryptography, and the inclusion of a message integrity check using a message authentication code configured to prevent loss or alteration of data during transmission. Transport-level security mechanisms implemented by private network authentication server 36 and merchant network authentication server 38 include, without limitation, transport-level security mechanisms implemented using one of the Transport Layer Security (TLS) and Secure Sockets Layer (SSL) protocols. In contrast, message-level security mechanisms are applied to each message transmitted between communicating parties. More specifically, each message is secured individually and generally includes security-related information configured to permit access by an authenticated party. Examples of security-related information include, without limitation, digital signatures, digital certificates, and encryption/decryption keys. Accordingly, in certain embodiments, private network authentication server 36 applies one or more message-level security mechanisms to authentication data provided to merchant network authentication server 38

After merchant authentication server 38 authenticates accountholder 22, accountholder 22 may initiate an online payment transaction for goods and services offered by merchant 24. During the course of such transactions, merchant 24 may send an authentication request message containing pre-authentication data to cardholder authentication computing device 34. Cardholder authentication computing device 34 may then analyze the contents of the authentication request message, including the pre-authentication data, to determine whether the online payment transaction is potentially fraudulent. Based on the results of the analysis, cardholder authentication computing device 34 generates an authentication response message indicating the results of the analysis and transmits the authentication response message to merchant 24. To the extent the authentication response message indicates that cardholder 22 is authenticated, merchant 24 may proceed with the payment card transaction, i.e., merchant 24 may submit the payment card transaction for authorization to issuer bank 30.

If accountholder 22 is authenticated and a request for authorization is accepted, the available credit line of accountholder 22 is decreased, that is, account 32 is decreased. A charge for a payment card transaction may not be posted immediately to account 32 of accountholder 22 because payment networks, such as MasterCard International Incorporated, may have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If accountholder 22 cancels a transaction before it is captured, a "void" is generated. If accountholder 22 returns goods after capture of the transaction, a "chargeback" is generated. Interchange network 28 and/or issuer bank 30 stores the transaction card information, such as a type of merchant, amount of purchase, date of purchase, in a database.

After a purchase has been made, a clearing process occurs to transfer additional transaction data related to the purchase among the parties to the transaction, such as merchant bank 26, interchange network 28, and issuer bank 30. According to various aspects herein, during the clearing process, additional data (i.e., addendum data), may be added to the transaction data. Accordingly, addendum data may be associated with a transaction and transmitted between parties to the transaction as transaction data, and may be stored by any of the parties to the transaction.

After a transaction is authorized and cleared, the transaction may be settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In certain embodiments, seamless authentication of accountholder 22 by merchant authentication server 38 requires accountholder 22 to register with the merchant website. Registering with the merchant website generally includes creating an account with the merchant website and providing a username or other user identifier (such as an email address) to identify accountholder 22 during subsequent access of the merchant website. In certain embodiments, registering includes creating a profile or account for accountholder 22 including, without limitation, additional user information, user payment information, user preferences, a browsing history, and a purchase history. If accountholder 22 registers with the merchant website through private network 21, registration may further include associating accountholder 22 with the organization corresponding to private network 21 and/or a program, such as a discount or rewards program, in which the organization is enrolled. After registration, accountholder 22 is authenticated, at least in part, by merchant authentication server 38 comparing the authentication data received from private network authentication server 36 to the information obtained during registration. For example, in certain embodiments, merchant authentication server 38 determines whether a user identifier in the authentication data corresponds to a registered user and whether any authentication indicated by the authentication data satisfies the authentication requirements of the merchant website.

Example of a Cardholder Authentication System

Figure 2:
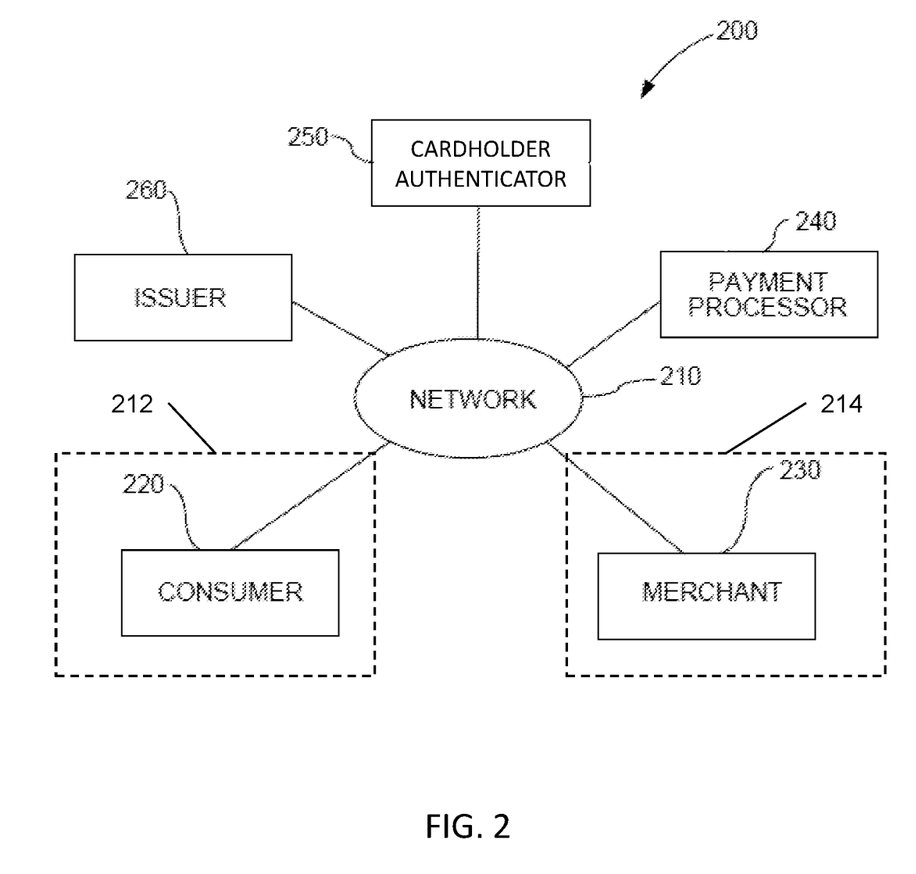
FIG. 2 is a diagram illustrating a cardholder authentication system including the cardholder authentication computing device shown in FIG. 1, in communication with the payment processing system of FIG. 1.

FIG. 2 is a diagram illustrating a cardholder authentication system 200 including a consumer, a merchant, a payment processor, an issuer, and a device authenticator, which may correspond to cardholder authentication computing device 34 (shown in FIG. 1), in accordance with an example embodiment of the present disclosure.

Referring to FIG. 2, cardholder authentication system 200 includes computing devices that respectively represent a consumer 220, a merchant 230, a payment processor 240, a cardholder authenticator 250, and an issuing bank ("issuer") 260 which are connected to each other via network 210. Network 210 may include the Internet, the interchange network 28 of FIG. 1, and/or one or more other networks. For example, a connection between the computing devices may include a wireless network, a wired network, a telephone network, a cable network, a combination thereof, and the like. Examples of a wireless network include networks such as WiFi, WiMAX, WiBro, local area network, personal area network, metropolitan area network, cellular, Bluetooth, and the like.

Consumer 220 may be a computing device, for example, a mobile phone, a smart phone, a telephone, a computer, a laptop, a desktop, a tablet, an MP3 player, a digital assistant, a server, and the like. Consumer 220 may access a website that corresponds to the merchant 230 or that is hosted by merchant 230, may contact a phone number of merchant 230, and the like. Payment processor 240 may be a processing entity such as MASTERCARD®, VISA®, AMERICAN EXPRESS®, and the like. Issuer 260 may be a third-party bank that issued a payment card to a cardholder. For example, issuer 260 may correspond to payment processor 240.

As depicted in FIG. 2, consumer 220 is part of a private information system 212. Similarly merchant 230 is part of a merchant information system 214. Consumer 220 must generally be authenticated to access private information system 212 and to perform online payment transactions via merchant information system 214. With regards to private information system 212, consumer 220 may be authenticated in various ways including, but not limited to, providing a user name and password, a security key, or a token or other authentication data object to a private network authentication server. In general, authentication by a private network authentication server is referred to herein as pre-authentication. After pre-authentication by the private network authentication server, merchant 230 further authenticates consumer 220. More specifically, authentication data is passed from the private network authentication server to a merchant authentication server, which authenticates users of merchant information system 214.

Cardholder authenticator 250 is configured to receive authentication request messages from merchant 230 and to authenticate users, such as consumer 220, who conduct online payment transactions through a merchant website associated with merchant 230. Authentication request messages received by cardholder authenticator 250 generally include pre-authentication data indicating that consumer 220 was pre-authenticated by a private network authentication server and cause cardholder authenticator 250 to perform an authentication process based, at least in part, on the pre-authentication data. If a cardholder was pre-authenticated, cardholder authenticator 250 may treat the consumer and transaction as being inherently low risk and may limit the authentication process. For example, in certain authentication processes, cardholder authenticator 250 may calculate a fraud score based on a comparison of data contained in the authentication request and historical cardholder transactions and authenticate or reject the authentication request based on whether the fraud score exceeds a predetermined fraud threshold. To the extent the authentication request messages indicates that the cardholder is pre-authenticated, cardholder authenticator 250 may disregard certain factors when calculating the fraud score or may modify raise the fraud score threshold. After performing the authentication process, cardholder authenticator 250 generates an authentication response message indicating the result of the authentication process and transmits the authentication response message to merchant 230 over network 210.

To the extent the authentication response message indicates that consumer 220 was successfully authenticated by cardholder authenticator 250, merchant 230 may proceed with processing the transaction. In addition to authentication, the lifecycle of a payment card transaction generally includes an authorization process, a clearing process, and a settlement process. During the authorization process, transaction data for authorizing the transaction may be transmitted between merchant 230, payment processor 240, and issuer 260. For example, the transaction data may include a name, a payment card account number, a transaction amount, a date and/or a time of the transaction, and the like.

If the transaction is authorized by issuer 260 (e.g., by confirming that the account associated with the transaction data contains sufficient funds), the issuer 260 may send notice of authorization to one or more of payment processor 240 and merchant 230. This process typically occurs within a few seconds to a few minutes of the request to authorize the transaction. After the transaction has been authorized, the transaction may be forwarded to the payment processor 240 for settlement typically later that same day, week, and the like. The settlement process includes the money being transferred from a cardholder's bank to a merchant's bank. During settlement, prior to settlement, and/or after settlement, a clearing process occurs for the transaction. The clearing process typically includes arranging bank/credit accounts for transfer of money/securities. For example, the clearing process may include payment processor 240 validating information and approving the purchase information from the merchant 230. According to various aspects, during the clearing process, the transaction data obtained during authorization may be supplemented by addendum data by the merchant 230, the payment processor 240, and the like. The clearing process may be completed after the authorization of the transaction is completed, for example, at the end of the same business day, one day later, two days later, and the like.

The addendum data may be added during a transaction lifecycle, for example, during the clearing process (if not included in the authorization process) and may include additional information about a transaction, one or more items purchased in the transaction, merchant information, cardholder information, and the like, which was not available during the authorization process. As another example, the addendum data may include information that was available during the authorization process but that was not processed during the authorization process. As yet another example, the addendum data may include information subsequently added to the transaction after the authorization process, and the like. Also, as described herein, transaction data may include authorization data and addendum data. In some examples, the authorization data and the addendum data may partially overlap, or not overlap at all. In some cases, the addendum data may be added, or partially added during the authorization process. As another example, the addendum data may be added after the authorization process.

Example of Cardholder Authentication Computing Device

Figure 3:
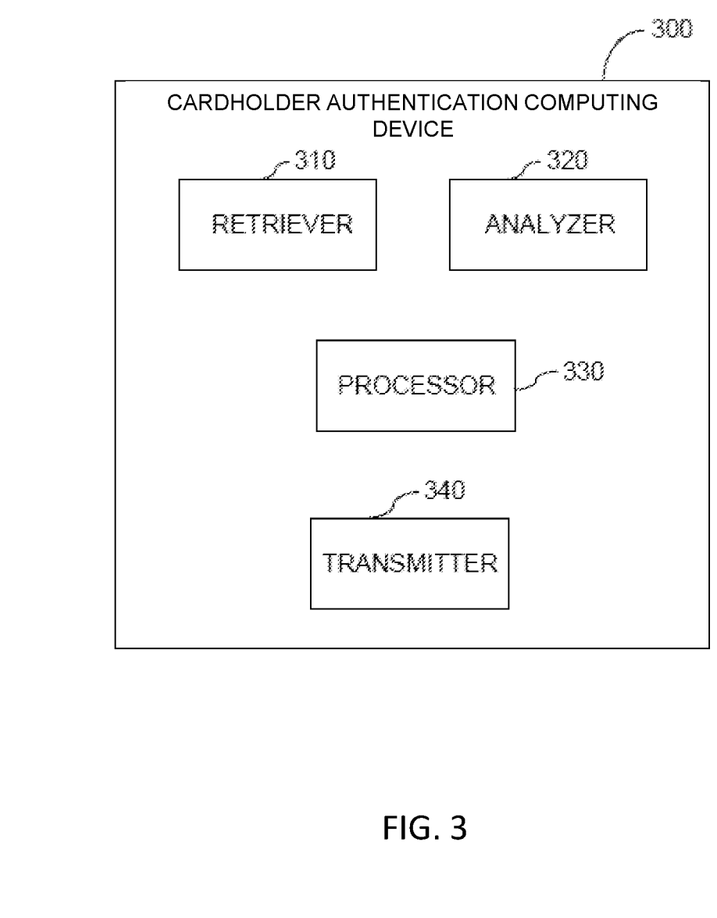
FIG. 3 is a diagram illustrating an example of the cardholder authentication computing device shown in FIGS. 1 and 2.

FIG. 3 is a diagram illustrating an example embodiment of a cardholder authentication computing device that may be included in the cardholder authentication system 200 of FIG. 2, in accordance with an example embodiment of the present disclosure.

Referring to FIG. 3, cardholder authentication computing device 300 may correspond to cardholder authenticator 250 shown in FIG. 2. Cardholder authentication computing device 300 may be coupled to payment processor 240 or may be a separate computing device included in the system of FIG. 2, and may be connected to one or more of the other computing devices via network 210. In this example, cardholder authentication computing device 300 includes a receiver 310, an analyzer 320, a processor 330, and a transmitter 340. Cardholder authentication computing device 300 may include additional components not shown, or less than the amount of components shown. Also, one or more of the components in this example may be combined or may be replaced by processor 330. The computer components described herein (e.g., receiver 310; analyzer 320; processor 330; and transmitter 340) may include hardware and/or software that are specially configured or programmed to perform the steps described herein.

Receiver 310 may be configured to receive data from various sources. For example, receiver 310 may receive authentication request messages from one or more merchants, such as merchant 230 of FIG. 2. Receiver 310 may also be configured to receive data or messages from one or more cardholder computing devices or from a server or other computing device corresponding to one of a payment processor and an issuer.

Analyzer 320 may analyze authentication requests received from merchants. For example, analyzer 320 may filter or otherwise extract specific pieces of data from authentication requests for use in authenticating cardholders. In certain embodiments, analyzer 320 may determine whether an authentication request message received from a merchant includes pre-authentication data indicating that a purported cardholder attempting to conduct an online payment transaction with the merchant was pre-authenticated by a private network. For example, analyzer 320 may determine if the authentication request message includes a flag, data, or other indicator for indicating that the cardholder was pre-authenticated by a private network. As another example, the pre-authentication data may be data indicating the identity of one or both of the merchant and an entity, such as a business, associated with the private network. Accordingly, analyzer 320 may compare the identified merchant, entity, and/or combination of merchant and entity to a repository containing a list of known merchants and entities having trusted relationships.

Processor 330 may further analyze and process the data received by receiver 310 and analyzed by analyzer 320. For example, in certain embodiments, processor 330 may perform an authentication process on the data contained in the authentication request message, including the pre-authentication data. Such an authentication process may a include fraud analysis which may further include comparing the data contained in the authentication request message with previous cardholder transaction data and/or other stored data regarding the cardholder, the organization to which the cardholder belongs, the merchant, and the like. Based on such comparisons, processor 330 may generate a fraud score or otherwise determine a likelihood of fraud for the online payment transaction.

In certain embodiments, processor 330 may vary the authentication process based on the pre-authentication data contained in the authentication request message. For example, processor 330 may consider transactions involving pre-authenticated cardholders as being inherently low risk and subject such authentication requests to less onerous authentication processes. By doing so, processing resources required for authentication may be conserved.

In addition to modifying the method of authentication, processor 330 may be configured to consider certain data based on whether an authentication request message indicates that a cardholder is pre-authenticated. For example, processor 330 may determine whether the host internet protocol (IP) address or a geographic location associated with the host IP address of the purported cardholder corresponds to a public IP address of the private network or a geographic location of an organization associated with the private network. To the extent the IP addresses or geographic locations are inconsistent, cardholder authentication computing device 300 may deny authentication of the purported cardholder.

In certain embodiments, processor 330 may also determine whether one or more partner services apply to online payment transactions between the merchant and the purported cardholder. For example, cardholder authentication computing device 300 may determine, based on the pre-authentication data, an organization associated with the private network through which the user was pre-authenticated and determine whether any partner services are offered between the merchant and the organization. Such partner services may include, but are not limited to, discounts, rebates, free shipping, and the like. Accordingly, in response to receiving an authentication request message from a merchant computing device, cardholder authentication computing device 300 may additionally determine whether one or more partner services apply to the online payment transaction. Cardholder authentication computing device 300 may then include partner service data, such as an identifier corresponding to applicable partner services and/or the parameters of such services (e.g., discount amounts), in the authentication response message prior to sending the authentication response message to the merchant computing device.

In certain embodiments, cardholder authentication computing device 300 may access a database or other data source containing information regarding which partner services apply to particular transactions. For example, in certain embodiments, the data source may contain lists of specific merchant/organization pairings and corresponding partner services. In other embodiments, the data source may contain a plurality of rules or logical tests that may be applied to characteristics of the organization to determine which partner services apply.

In certain embodiments, accessing partner services may require the cardholder to enroll with one or more of the following: the organization associated with the private network, the merchant providing the partner service, and cardholder authentication computing device 300. For example, prior to participating in partner services, the cardholder may be required to access and provide credentials to a merchant website while being logged into a private network. The merchant may then create an account or record corresponding to the cardholder, identifying the cardholder as being eligible for partner services. Enrollment may also include an additional verification step. For example, the merchant, organization, or cardholder authentication computing device 300 may send an email or other message to the cardholder confirming enrollment. The cardholder may also be required to confirm receipt of the email by, for example, by clicking a link within the email.

Processor 330 may also be configured to determine whether a payment card (or a corresponding virtual payment card) used for an online payment transaction is associated with an organization (e.g., a corporate card) and whether any particular payment account use parameters apply to the payment card. For example, use of a corporate card may be subject to certain spending limits or limited to certain purchase categories. Accordingly, in certain embodiments, processor 330 may determine whether any such use parameters apply and include indicators corresponding to any applicable payment account use parameters in authentication response messages. In cases where transaction data is included in an authentication request message, processor 330 may determine whether the transaction data complies with any applicable payment card use parameters and may accept or reject authentication based on such a determination. To the extent the attempted purchase falls outside such use parameters, the authentication computing device may decline authentication of the transaction and/or include a corresponding indication in the authentication response message.

Following authentication, processor 330 may generate an authentication response message indicating that the purported cardholder is the actual cardholder associated with the payment account information. In certain embodiments, the authentication response message may include an accountholder authentication value (AAV) or similar authentication token indicating that the purported cardholder was authenticated. The authentication token may then be used by the merchant, for example, during a payment authorization process to indicate to an issuing bank that the cardholder was authenticated.

Cardholder authentication computing device 300 may also include a transmitter 340 for transmitting data, including authentication response messages. Transmitter 340 may be configured to transmit data to any of a cardholder, a payment processor, an issuer, a merchant, an organization, and the like.

Example Cardholder Authentication

Figure 4:
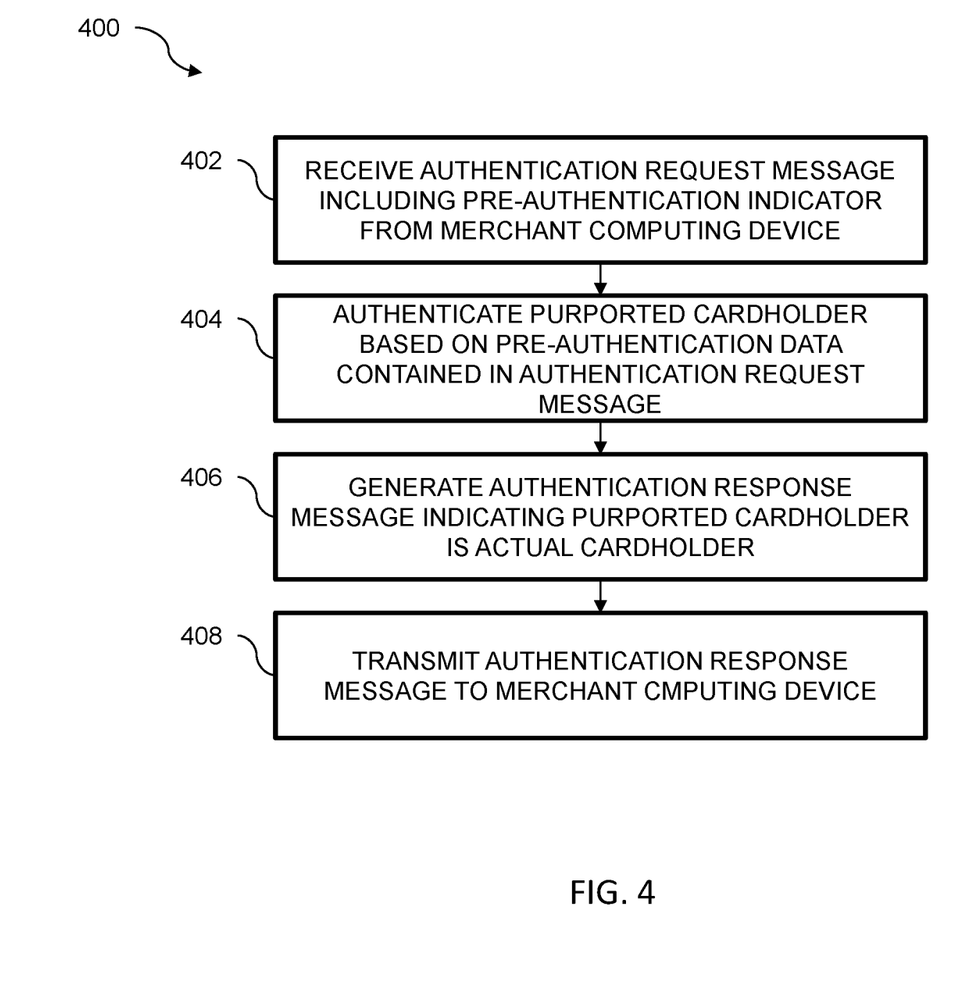
FIG. 4 is a flow chart illustrating an example method for authentication a cardholder using the cardholder authentication computing device shown in FIGS. 1-3 in accordance with one example embodiment of the present disclosure.

FIG. 4 is a diagram illustrating an example of a method 400 for authenticating a cardholder performed by cardholder authentication computing device, such as cardholder authentication computing device 300 of FIG. 3.

Method 400 includes receiving an authentication request message 402 associated with an online payment transaction between a merchant and a purported cardholder at the cardholder authentication computing device. The authentication request is generally sent by a merchant computing device associated with the merchant to the cardholder authentication computing device and includes pre-authentication data indicating that the purported cardholder was pre-authenticated by a private network. In certain embodiments, the authentication request message may also include details of the online payment transaction including, but not limited to, the type and price of the goods or services being purchased.

The pre-authentication data contained in the authentication message may indicate that the purported cardholder was pre-authenticated by a private network. For example, a private network authentication server may have authenticated the purported cardholder when the purported cardholder logged into the private network. Such authentication may have required the purported cardholder to provide credentials, such as a user name and password, and/or credential data accessed from a user computing device of the purported cardholder, such as a cookie or security token. The private network authentication server may then exchange authentication data with a merchant authentication server when the purported cardholder accesses the merchant website, thereby authenticating the purported cardholder for purposes of navigating and using the merchant website. Such an exchange of authentication data may be achieved through the generation and exchange of a token generated by the private network authentication server or by distribution by the private network authentication server of the credentials provided by the purported cardholder. In certain embodiments, the exchange of authentication data may conform to one or more standards, such as the Security Assertion Markup Language (SAML) specification.

After the cardholder authentication computing device receives an authentication request message, the cardholder authentication computing device authenticates the cardholder based, at least in part, on data contained in the authentication request message 402 and, in particular, the pre-authentication data contained in the authentication request message. Authentication, in the context of step 404, refers to the process of determining whether the purported cardholder corresponds to the actual cardholder whose payment account information was submitted as part of the online payment transaction by the purported cardholder. Accordingly, authentication generally includes comparing data received in an authentication request message or derived from such data by the cardholder authentication computing device to baseline data which may include historical transaction data and/or verified payment account information accessible by the cardholder authentication computing device. If the data contained in the authentication request is inconsistent with the baseline data, the cardholder authentication computing device may determine that the purported cardholder is not the actual cardholder associated with the submitted payment account information and may reject the authentication request. In certain embodiments, authentication may include a fraud analysis in which the cardholder authentication computing device generates a fraud score corresponding to the likelihood that a given online payment transaction is fraudulent. In conducting such an analysis the cardholder authentication computing device may assign different weights to different data elements based on their relative ability to predict fraudulent activity.

Based on the pre-authentication data included in the authentication request message, the cardholder authentication computing device may vary its authentication process. More specifically, the presence of pre-authentication data may cause the cardholder authentication computing device to treat the purported cardholder as presenting a low fraud risk. Accordingly, the authentication process implemented by the cardholder authentication computing device may be less onerous as compared to one that would be applied to a non-pre-authenticated cardholder. For example, the cardholder authentication computing device may disregard or modify weights given to certain data during the authentication process. The cardholder authentication computing device may also raise a fraud threshold, such as a minimum fraud score, that would cause the cardholder authentication computing device to reject the authentication request.

The cardholder authentication computing device may also modify its authentication process by considering additional factors during authentication based on the pre-authentication data. For example, the cardholder authentication computing device may identify an organization associated with the private network that pre-authenticated the purported cardholder and retrieve details regarding the organization. The cardholder authentication computing device may then compare data contained in or derived from the authentication request message to the organization data to authenticate the purported cardholder. For example, the cardholder authentication computing device may retrieve the public IP address and/or geographic location of the organization and may compare such information to the host IP address and/or corresponding geographic location of the purported cardholder. To the extent the comparison shows that the purported cardholder is accessing the merchant website via an unknown IP address or from a suspect geographic location, the cardholder authentication computing device may reject the authentication request.

After conducting authentication, the cardholder authentication computing device may generate an authentication response message 406 including the results of the authentication process. In certain embodiments, the authentication response message may include an authentication value, such as an AAV, or a similar authentication token, to indicate the purported cardholder is, in fact, the actual cardholder associated with the submitted payment account information.

After the cardholder authentication computing device generates an authentication response message, it may then transmit the authentication response message accordingly in step 408.

In certain embodiments, messages sent and received by the cardholder authentication computing device may conform to one or more standards. Such standards may include, but are not limited to ISO 8583 and ISO 20022, which generally provide for the format and content of messages related to electronic transactions made by cardholders using payment cards and message transmitted between financial institutions, respectively.

ADDITIONAL CONSIDERATIONS

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for cardholder authentication during online transactions. In this example, the computing device may include a memory device and a processor in communication with the memory device, and when executed by said processor, the computer-executable instructions may cause the processor to perform a method, such as the methods described and illustrated in the example of FIG. 4.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A merchant authentication computing device, said merchant authentication computing device comprising one or more processors in communication with one or more memory devices and a merchant website, said merchant authentication computing device configured to:
    receive, from a private network authentication server of a private network in response to a user computing device accessing the merchant website via the private network, pre-authentication data including a federated identity token, the federated identity token including a user identifier and indicating that the private network has authenticated the user computing device using credentials received from the user computing device to access the private network;
    verify that a user of the user computing device is registered with the merchant website, including performing a lookup of the user identifier in stored user profile data for the merchant web site;
    based on the verification, authenticate the user computing device for access to the merchant web site;
    in response to authenticating the user computing device and the user computing device initiating an online payment transaction on the merchant website using payment account information corresponding to a payment account of a cardholder, generate and transmit an authentication request message to a cardholder authentication computing device, the authentication request message including the federated identity token and the payment account information;
    receive, from the cardholder authentication computing device, an authentication response message indicating that the user of the user computing device is authenticated as the cardholder corresponding to the payment account information; and
    in response to the indication that the cardholder is authenticated, submit the online payment transaction to an issuing bank of the payment account for authorization.

2. The merchant authentication computing device in accordance with claim 1, wherein the federated identity token further includes an indication of an authentication method applied by the private network to authenticate the user computing device, and wherein said merchant authentication computing device is further configured to authenticate the user computing device for access to the merchant website based on verifying that the authentication method applied by the private network satisfies authentication requirements of the merchant website.

3. The merchant authentication computing device in accordance with claim 1, wherein said merchant authentication computing device is further configured to receive the federated identity token in conformance with Security Assertion Markup Language (SAML) specifications.

4. The merchant authentication computing device in accordance with claim 1, wherein said merchant authentication computing device is further configured to receive the pre-authentication data including a time of authentication by the private network authentication server.

5. The merchant authentication computing device in accordance with claim 1, wherein said merchant authentication computing device is further configured to implement, in association with receiving the pre-authentication data from the private network authentication server, a transport-level security mechanism characterized by at least one of a private connection between computer applications executing on said merchant authentication computing device and the private network authentication server, identity authentication of said merchant authentication computing device and the private network authentication server using public-key cryptography, or a message integrity check using a message authentication code configured to prevent loss or alteration of data during transmission.

6. The merchant authentication computing device in accordance with claim 1, wherein said merchant authentication computing device is further configured to implement, in association with receiving the pre-authentication data from the private network authentication server, a message-level security mechanism using at least one of digital signatures, digital certificates, or encryption/decryption keys.

7. The merchant authentication computing device in accordance with claim 1, wherein said merchant authentication computing device is further configured to:
receive, from the cardholder authentication computing device, the authentication response message further including partner service data, the partner service data including at least one of an identifier corresponding to applicable partner services or parameters of the applicable partner services; and
apply the applicable partner services to the online payment transaction between the merchant website and the user.

8. A computer-implemented method for authenticating user computing devices during online payment transactions, said method implemented using a merchant authentication computing device in communication with a merchant website, said method comprising steps performed by the merchant authentication computing device of:
receiving, from a private network authentication server of a private network in response to a user computing device accessing the merchant website via the private network, pre-authentication data including a federated identity token, the federated identity token including a user identifier and indicating that the private network has authenticated the user computing device using credentials received from the user computing device to access the private network;
verifying that a user of the user computing device is registered with the merchant website, including performing a lookup of the user identifier in stored user profile data for the merchant web site;
based on the verification, authenticating the user computing device for access to the merchant website;
in response to authenticating the user computing device and the user computing device initiating an online payment transaction on the merchant website using payment account information corresponding to a payment account of a cardholder, transmitting an authentication request message to a cardholder authentication computing device, the authentication request message including the federated identity token and the payment account information;
receiving, from the cardholder authentication computing device, an authentication response message indicating that the user of the user computing device is authenticated as the cardholder corresponding to the payment account information; and
in response to the indication that the cardholder is authenticated, submitting the online payment transaction to an issuing bank of the payment account for authorization.

9. The method in accordance with claim 8, wherein the federated identity token further includes an indication of an authentication method applied by the private network to authenticate the user computing device, and wherein authenticating the user computing device for access to the merchant website further comprises verifying that the authentication method applied by the private network satisfies authentication requirements of the merchant website.

10. The method in accordance with claim 8, further comprising receiving the federated identity token in conformance with Security Assertion Markup Language (SAML) specifications.

11. The method in accordance with claim 8, further comprising receiving the pre-authentication data including a time of authentication by the private network authentication server.

12. The method in accordance with claim 8, wherein receiving the pre-authentication data from the private network authentication server comprises implementing a transport-level security mechanism characterized by at least one of a private connection between computer applications executing on said merchant authentication computing device and the private network authentication server, identity authentication of said merchant authentication computing device and the private network authentication server using public-key cryptography, or a message integrity check using a message authentication code configured to prevent loss or alteration of data during transmission.

13. The method in accordance with claim 8, wherein receiving the pre-authentication data from the private network authentication server comprises implementing a message-level security mechanism using at least one of digital signatures, digital certificates, or encryption/decryption keys.

14. The method in accordance with claim 8, further comprising:
receiving, from the cardholder authentication computing device, the authentication response message further including partner service data, the partner service data including at least one of an identifier corresponding to applicable partner services or parameters of the applicable partner services; and
applying the applicable partner services to the online payment transaction between the merchant website and the user.

15. A non-transitory computer-readable storage medium having computer-executable instructions embodied thereon, wherein when executed by a merchant authentication computing device having one or more processors in communication with one or more memory devices and a merchant website, the computer-executable instructions cause the merchant authentication computing device to:

receive, from a private network authentication server of a private network in response to a user computing device accessing the merchant website via the private network, pre-authentication data including a federated identity token, the federated identity token including a user identifier and indicating that the private network has authenticated the user computing device using credentials received from the user computing device to access the private network;

verify that a user of the user computing device is registered with the merchant website, including performing a lookup of the user identifier in stored user profile data for the merchant web site;

based on the verification, authenticate the user computing device for access to the merchant web site;

in response to authenticating the user computing device and the user computing device initiating an online payment transaction on the merchant website using payment account information corresponding to a payment account of a cardholder, transmit an authentication request message to a cardholder authentication computing device, the authentication request message including the federated identity token and the payment account information;

receive, from the cardholder authentication computing device, an authentication response message indicating that the user of the user computing device is authenticated as the cardholder corresponding to the payment account information; and     in response to the indication that the cardholder is authenticated, submit the online payment transaction to an issuing bank of the payment account for authorization.

16. The non-transitory computer-readable storage medium in accordance with claim 15, wherein the federated identity token further includes an indication of an authentication method applied by the private network to authenticate the user computing device, and wherein the computer-executable instructions further cause the merchant authentication computing device to further authenticate the user computing device for access to the merchant website based on verifying that the authentication method applied by the private network satisfies authentication requirements of the merchant website.

17. The non-transitory computer-readable storage medium in accordance with claim 15, wherein the computer-executable instructions further cause the merchant authentication computing device to receive the federated identity token in conformance with Security Assertion Markup Language (SAML) specifications.

18. The non-transitory computer-readable storage medium in accordance with claim 15, wherein the computer-executable instructions further cause the merchant authentication computing device to implement, in association with receiving the pre-authentication data from the private network authentication server, a transport-level security mechanism characterized by at least one of a private connection between computer applications executing on the merchant authentication computing device and the private network authentication server, identity authentication of the merchant authentication computing device and the private network authentication server using public-key cryptography, or a message integrity check using a message authentication code configured to prevent loss or alteration of data during transmission.

19. The non-transitory computer-readable storage medium in accordance with claim 15, wherein the computer-executable instructions further cause the merchant authentication computing device to implement, in association with receiving the pre-authentication data from the private network authentication server, a message-level security mechanism using at least one of digital signatures, digital certificates, or encryption/decryption keys.

20. The non-transitory computer-readable storage medium in accordance with claim 15, wherein the computer-executable instructions further cause the merchant authentication computing device to:

receive, from the cardholder authentication computing device, the authentication response message further including partner service data, the partner service data including at least one of an identifier corresponding to applicable partner services or parameters of the applicable partner services; and     apply the applicable partner services to the online payment transaction between the merchant website and the user.

\* \* \* \* \*